May 1, 1951 E. LAXO 2,551,020
CAN TESTER LEAK DETECTING MECHANISM
Filed Aug. 1, 1947 3 Sheets-Sheet 2

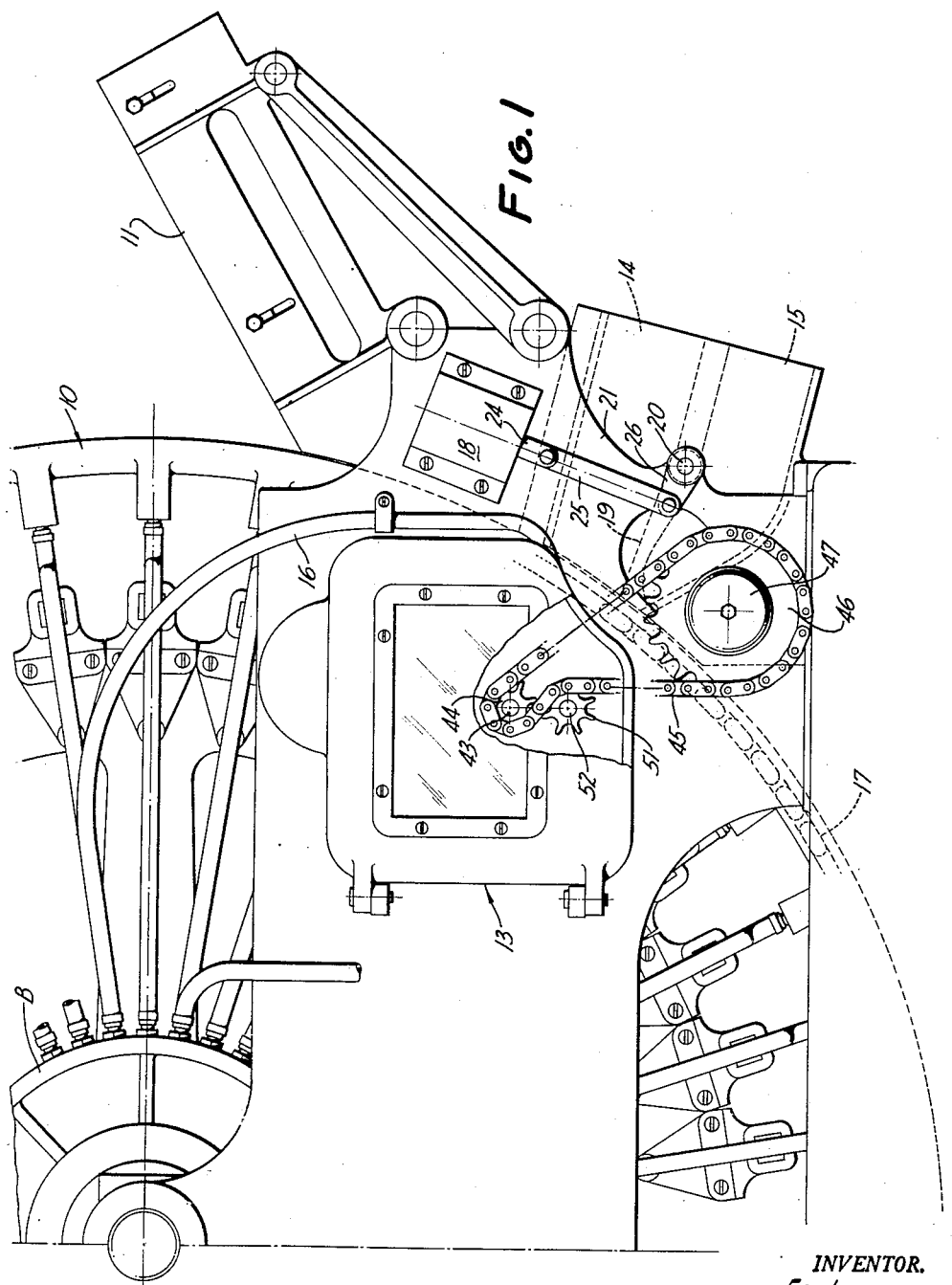

INVENTOR.
ED LAXO
BY
Mellin & Hanscom
ATTORNEYS

May 1, 1951 E. LAXO 2,551,020
CAN TESTER LEAK DETECTING MECHANISM
Filed Aug. 1, 1947 3 Sheets-Sheet 3

INVENTOR.
ED LAXO
BY
Mellin & Hanscom
ATTORNEYS

Patented May 1, 1951

2,551,020

UNITED STATES PATENT OFFICE 2,551,020

CAN TESTER LEAK DETECTING MECHANISM

Ed Laxo, Oakland, Calif., assignor to Atlas Imperial Diesel Engine Co., Oakland, Calif., a corporation of Delaware Application August 1, 1947, Serial No. 765,485

3 Claims. (Cl. 73—43)

This invention pertains to can testers, and particularly to mechanisms for detecting leaky cans and effecting their separation from good cans.

In a can tester, a detecting mechanism is employed for controlling the discharge of the cans from the tester into either a good can chute or a poor can chute. The cans are clamped on a carrier wheel, and are then subjected to compressed air, the detector being successively connected with each can under pressure on the wheel for pressure actuation of the detecting mechanism and control of the can's discharge from the tester wheel.

The portion of the detecting mechanism subject to the air pressure in the can has only a relatively small range of movement, making it difficult to detect accurately good and poor cans in dependence upon the extent of such movement. Accordingly, it is an object of the present invention to provide a can detecting mechanism which is more sensitive to variations in air pressure within the cans on the tester in order to effect accurate segregation between good and leaky cans.

Another object of the invention is to provide a comparatively simple can tester leak detecting mechanism in which the range of movement of the pressure actuatable portion of the mechanism is multiplied considerably while maintaining the friction of the moving parts to a minimum, thereby increasing the sensitivity and accurate functioning of the mechanism.

One form which the invention may assume is exemplified in the following description and illustrated by way of example in the accompanying drawings, in which:

Fig. 1 is a side elevation of part of the can tester.

Figure 5:
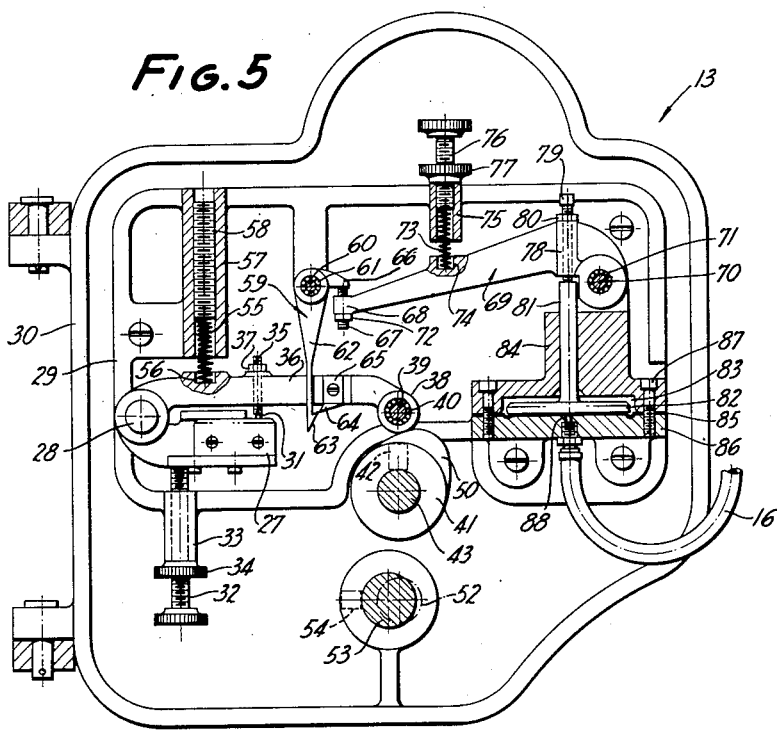
Fig. 5 is an elevation of the detecting mechanism internally of its housing, parts being shown in section.

The detecting mechanism of the can tester is adapted to determine the loss in air pressure, if any, within cans clamped on a can tester wheel 10 during its rotation from a position in which air under pressure is supplied to the cans, and a second position almost a complete revolution removed from the point of introduction of air to the cans, wherein the cans are connected through a suitable valve mechanism to the detecting mechanism. As is known in the art, the cans to be tested enter the can tester wheel 10 from a feed or intake chute 11 onto pockets 12 spaced around the peripheral portion of the wheel, each can being automatically clamped in leakproof relation to the wheel, air then being introduced to the can, the supply of air promptly cut off and the air entrapped within the can and the can conveyed by the wheel almost 360 degrees where it is communicated through suitable tubing to the diaphragm box 13 of the detecting mechanism, which determines, in dependence upon the air pressure in the can, whether it will be discharged into the good can chute 14 or into the poor can chute 15.

In my copending applications for "Can Tester Pocket Assembly," Serial No. 765,483, filed Aug. 1, 1947; "Can Tester Valve Mechanism," Serial No. 765,484, filed August 1, 1947 now Patent No. 2,482,677; and "Can Tester Drive Mechanism," filed August 1, 1947, Serial No. 765,488; the clamping mechanism, valve mechanism B and drive mechanism for the can tester are described in detail. For purposes of the present specification, it is sufficient to state that each can is successively placed in registry with a passage in the valve mechanism B connected to the detecting mechanism 13 through a flexible tube 16, the detecting mechanism functioning to determine the direction of discharge of the cans from the tester wheel 10 after unclamping of each can therefrom.

In the specific form of tester disclosed in the drawings, the tester wheel 10 is rotated by a chain drive 17 encompassing its periphery and engaging a driving sprocket (not shown) suitably rotated through a gear reducer and electric motor (both not shown). The cans, as aforestated, are received from the feed chute 11 and are clamped to the wheel 10, being conveyed with the wheel through approximately 330 degrees, or any other suitable extent, after the air under pressure has been introduced into the cans, the cans then being placed in communication with the detecting mechanism 13.

The detecting mechanism controls a solenoid 18 which operates a gate 19 fixed to a shaft 20 pivotally mounted in the sides 21 of the machine frame and adapted to occupy an upper position, in which the cans are directed into the lower, poor can chute 15, and into a lower position, in which cans are directed into the upper good can chute 14. Downward movement of the gate 19 is effected by a tension spring 22 having one end attached to the side frame 21 of the machine and its other end to an arm 23 secured to the shaft 20 to which the gate is secured. Upward movement of the gate 19 about the axis of the shaft 20 is produced by the solenoid 18, whose plunger 24 is attached, through a suitable link 25, to another arm 26 attached to the gate shaft 20.

When the solenoid coil is energized, the plunger 24 is pulled therewithin to swing the arm 26 and gate 19 in an upward direction. The solenoid 18 is connected in a circuit including the detecting mechanism, and such circuit is only closed when the detecting mechanism is connected to a leaky can, causing the circuit through the solenoid to be completed and the gate 19 swung upwardly in order that such leaky can will be discharged into the poor can chute 15 and segregated from the good cans.

Figure 6:
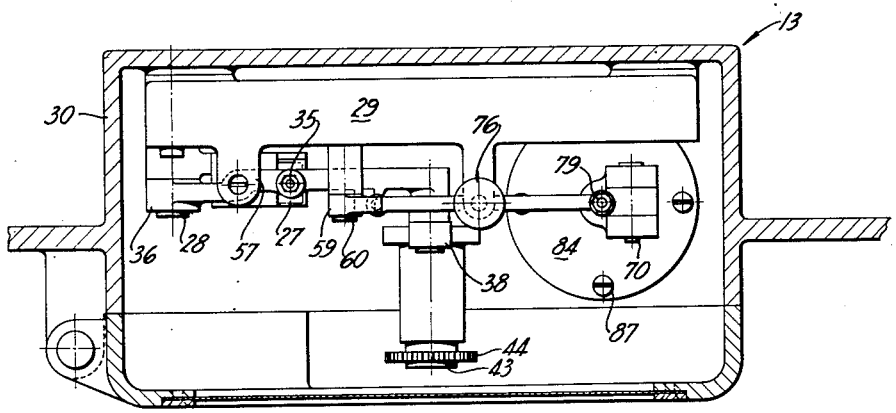
Fig. 6 is a top plan view of the mechanism disclosed in Fig. 5.
Figure 2:
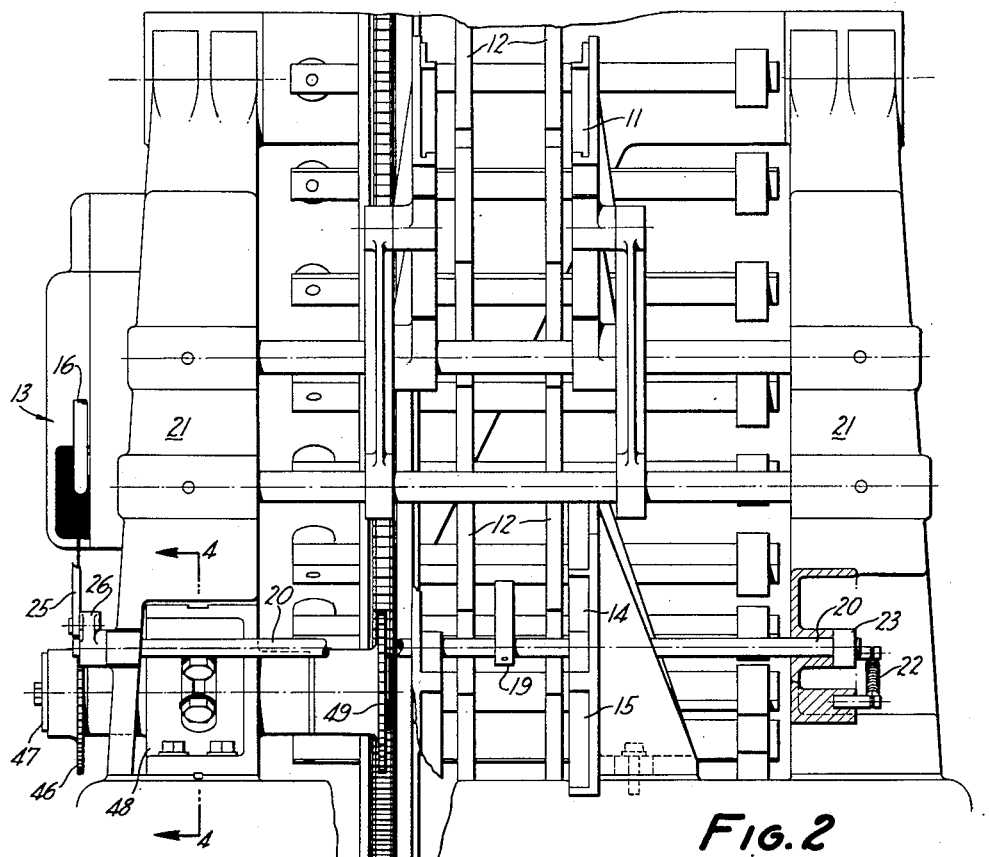
Fig. 2 is a front elevation of the can tester disclosed in Fig. 1.
Figure 4:
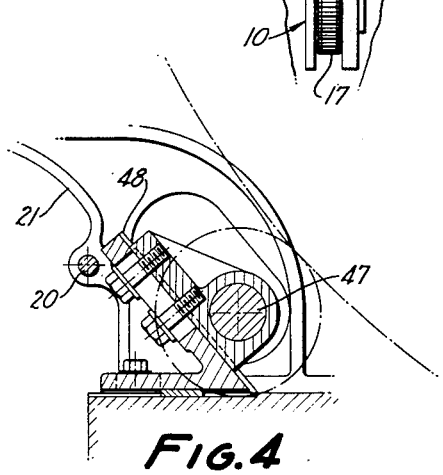
Fig. 4 is a section taken along the line 4—4 on Fig. 2.
Figure 3:
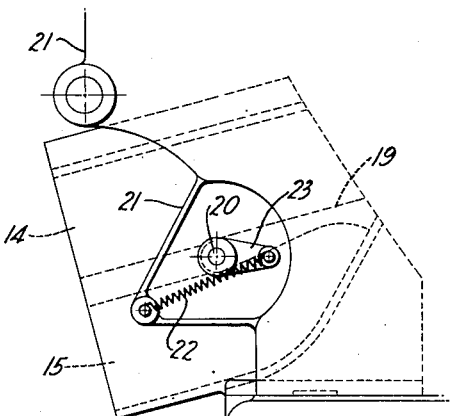
Fig. 3 is a side elevation of the discharge chute.

The solenoid 18 is in series with a micro-switch 27, normally in open position. This switch, however, is closed in response to the connection of the detecting mechanism to a poor can to produce swinging of the discharge chute gate 19 against the force of the spring 22. The switch may be of any suitable construction (see Figs. 5 and 6), being pivotally mounted on a stud 28 secured to the panel 29 of an indicator box 30 containing the detecting mechanism. By virtue of the pivotal mounting of the micro-switch 27, the uppermost position of its plunger or button 31 can be adjusted by means of a thumb screw 32 threaded through a depending boss 33 on the panel and engaging the lower side of the switch housing 27. Upon appropriate adjustment of the thumb screw 32 and location of the switch, a lock nut 34 threaded on the thumb screw may be tightened against the boss 33 to maintain the desired adjusted position of the switch 27.

The switch button 31 is subject to depression by a screw 35 threaded through a lever arm 36 pivotally mounted on the stud 28 and extending above and across the switch. This screw 35 may be adjusted with respect to the button 31 by threading it within the arm 36, being held in adjusted position by tightening a lock nut 37 on the screw against the arm. The outer end of the arm 36 carries a cam follower roller 38 on a pin 39 through the agency of an anti-friction roller bearing 40, and this follower is engageable with a peripheral cam 41 secured, as by means of a screw 42, to a shaft 43 to which a driven sprocket 44 is affixed (see Fig. 1). A chain 45 transmits motion between the driven sprocket 44 and a driving sprocket 46 secured to a shaft 47 rotatably mounted in a bracket 48 adjustably bolted to the machine frame. The shaft has another sprocket 49 thereon engageable with the exterior of the chain 17 encompassing the tester wheel 10. The position of the cam 41 and its cam lobe 50 upon the shaft 43, and the driving ratio between the carrier wheel 10 and cam shaft 43, are such that the cam makes one revolution for each can on the wheel. For example, if there are forty can pockets 12 on the wheel, the cam rotates forty revolutions for each revolution of the wheel, or one revolution per can.

Proper tension is maintained in the cam chain by an idler sprocket 51 rotatably mounted upon an eccentric stud 52, whose shaft 53 is journaled in the panel 29 and secured in any position of adjustment by a suitable set screw 54 threaded into the panel and bearing against the shaft.

As the cam 41 rotates, it elevates the arm 36 against the action of a compressed spring 55 whose lower end is received within a shallow cup 56 in the arm, the spring extending within an upper boss 57 in the panel and bearing against a set screw 58 threaded within the boss. By turning the set screw, the spring compression can be adjusted.

It is to be noted that as the cam 41 rotates, the screw 35 on the arm 36 is moved away from the switch button 31, and that the spring 55 tends to move the arm in the opposite direction, maintaining its roller 38 in engagement with the periphery of the cam, and also tending to urge the switch operating screw 35 against the button, to close the switch and the circuit to the solenoid 18. The ability of the spring to shift the lever arm 36 downwardly to an extent sufficient to engage the screw with the switch button is dependent upon the position of a latch 59 mounted upon a stub shaft 60 secured to the panel of the indicator mechanism, there being anti-friction roller bearings 61 between the central boss of the latch and the shaft 60 to hold friction to a minimum. The latch has a relatively long depending leg 62 terminating in a detent or hook 63 adapted to be received under the nose 64 of a latch plate 65 secured to the outer portion of the lever arm 36. The other end of the latch 59 consists of a horizontally extending materially shorter arm or leg 66 whose undersurface is engaged by a set screw 67 threaded through a boss 68 on the free end of an arm 69 journaled upon a stud 70 secured to the panel, there being anti-friction bearings 71 between the inner end of the arm 69 and its stud to hold friction to a minimum. The position of the set screw 67 in the arm can be adjusted by turning the former and holding it in such adjusted position by clamping a nut 72 on the set screw against the boss 68.

The latch control arm 69 is urged in a downward direction by a compressed spring 73, whose lower end is received within an intermediate shallow cup 74 on the arm and whose upper portion extends into a vertical boss 75 having a thumb screw 76 threaded therewithin and bearing against the upper end of the spring. Turning of the thumb screw 76 determines the compression of the spring 73, the thumb screw being held in adjusted position by the clamping of a lock nut 77 threaded on it against the boss 75.

The latch control arm 69 is movable upwardly by the pressure, if any, in each can on the tester wheel. The inner portion of the arm adjacent its pivot stud 70 is formed with a boss 78 through which an adjustable screw 79 is threaded, such screw being held in position by the clamping action of a lock nut 80 thereon against the upper end of the boss 78. The lower end of the screw 79 bears against the upper end of a stem or rod 81 integral with and extending upwardly from a piston 82 contained within a comparatively short cylinder 83 in a diaphragm box 84, the lower end of the piston bearing against a diaphragm 85 clamped between the cylindrical portion of the box 84 and an end plate or head 86 by cap screws 87 extending through the box and threaded into the plate. This plate 86 has a central passage 88 therethrough communicating with the flexible tubing 16 running to the valve mechanism B of the tester.

The diaphragm 85 has only a slight extent of movement under the action of air pressure in the cans on the tester wheel. If adequate air under pressure is contained within a can, the diaphragm 85 is deflected upwardly, moving the piston 82 and its stem 81 upwardly, and effecting upward swinging of the latch control arm 69 about its pivot 70 against the action of the spring 73, which tends to move the arm 69 downwardly and hold the piston 82 and diaphragm 85 in a downward position. Upward movement of the control arm 69 tends to swing the latch 59 in a counter-clockwise direction on its pivot stud 60, moving its hook or detent portion 63 under the nose 64 of the switch operating arm 36 and limiting downward movement of the latter under the influence of its spring 55, in order to prevent closing of the micro-switch.

In the event that insufficient or no pressure is contained within a can on the tester wheel when it is placed in communication with the flexible tubing 16, the spring 73 holds the control arm 69 in a downward position, allowing the depending latch leg 62 to swing outwardly from engageable location with the latch plate 64, permitting the switch operating arm 36 to be moved downwardly by the spring 55 when the follower roller 38 rides off the cam lobe 50. Such action causes depression of the micro-switch button 31 by the screw 35 and completion of the circuit through the solenoid 18, causing it to swing the gate 19 to an upper position, and the can, which determined the closing of the micro-switch, to be discharged into the poor can chute 15.

It is apparent that as the cam 41 rotates in synchronism with the rotation of the can carrier wheel 10, the switch control arm 36 is oscillated about its stud 28, the cam lobe 50 elevating the arm and the spring 55 tending to depress it. When a non-leaking can is connected to the diaphragm box 84, the piston 82 is elevated to swing the latch 59 into position wherein its hook or detent 63 is disposed under the nose 64 of the switch operating arm, which limits the depression of such arm by the spring 55 and prevents its movement of the switch button or plunger 31 to closed position. However, an air leaking can will have insufficient pressure to elevate the piston 82 in the diaphragm box 84, permitting the hook 63 at the lower end of the latch 59 to move outwardly from engagement with the nose 64 and allowing the spring 55 to move the switch operating arm 36 downwardly to close the switch 27. In the first mentioned instance, the circuit to the solenoid 18 is open and the spring 22 holds the gate 19 in a downward position, allowing the cans to be discharged into the good can chute 14. In the latter instance, the solenoid is energized to swing the gate 19 upwardly against the action of the spring, and the leaking can is discharged into the poor can chute 15.

The mechanism described is extremely sensitive. It is to be noted that the switch 27, when permitted to be actuated, is closed positively by the action of the spring 55 on the switch operating arm 36, and that this arm is elevated positively to a substantial extent by the cam lobe 50. The slight movement of the diaphragm 85 and piston 82 is magnified considerably in the present device because of the length of the lever arm 69 between the axis of the pivot stud 70 and the set screw 67 when compared with the distance between such stud 70 and the screw 79 engaging the piston stem or rod 81. A slight movement of the piston 82 results in a considerable relative movement of the free end of the arm 69 against the latch 59. This substantial movement is again multiplied in view of the ratios between the length of the horizontal latch arm 66 and the vertical latch arm 62, which produces swinging movement of the hook or detent portion 63 of the latch through a much greater distance than the free end of the horizontal latch arm 66 is moved by the arm 69 actuated by the piston. Thus, there is a double multiplication of movement of the detent 63 over the extent of movement of the diaphragm 85, the first multiplication being provided by the favorable lever arm ratios on the piston actuatable arm 69, and the second increase in movement being determined by the ratio between the horizontal and vertical latch arms 66, 62.

Not only is the sensitivity of the device enhanced by reason of multiplying the movement of the piston 82, but such sensitivity is further increased by the provision of the various antifriction bearings 71, 61 between the studs 70, 60 and piston actuatable arm 69 and latch 59, which permits such members to swing freely about their pivotal axes without hesitation or lag. Thus, the device responds promptly and accurately to the pressure condition in the diaphragm box 84. It is also to be noted that the device may be adjusted very accurately through manipulation of the various screws, which are readily rotatable and locked in their respective positions of adjustment.

It is, accordingly, apparent that a can tester leak detecting mechanism has been provided, which is extremely sensitive, and of simple construction and mode of operation.

While I have shown the preferred form of my invention, it is to be understood that various changes may be made in its construction by those skilled in the art without departing from the spirit of the invention as defined in the appended claims.

Having thus described my invention, what I claim and desire to secure by Letters Patent is:

1. A can tester, including a wheel for carrying cans from an intake station to a discharge station, means for effecting separation between good and bad cans on said wheel at the discharge station, means for introducing compressed air into said cans, pressure responsive means communicable with said cans and adapted for movement in dependence upon the air pressure therewithin, means comprising an electric switch for controlling said can separating means, a lever adapted to operate said switch, a cam rotatable in response to rotation of said wheel for moving said switch operating lever in one direction, a spring for moving said lever in the opposite direction to effect operation of said switch, a pivoted latch having one arm engageable with said lever for preventing its movement to switch operating position, a latch operating lever whose free end engages another arm of said latch, said pressure responsive means engaging said latch operating lever between its free end and fulcrum to move said latch operating lever in one direction, and spring means for moving said latch operating lever in the other direction.

2. A can tester, including a wheel for carrying cans from an intake station to a discharge station, means for effecting separation between good and bad cans on said wheel at the discharge station, means for introducing compressed air into said cans, pressure responsive means communicable with said cans and adapted for movement in dependence upon the air pressure therewithin, means comprising an electric switch for controlling said can separating means, a lever adapted to operate said switch, a cam rotatable in response to rotation of said wheel for moving said switch operating lever in one direction, a spring for moving said lever in the opposite direction to effect operation of said switch, a pivoted latch having a long arm engageable with said lever for preventing its movement to switch operating position, a latch operating lever whose free end engages a short arm of said latch, said pressure responsive means engaging said latch operating lever between its free end and fulcrum and adjacent said fulcrum to move said latch operating lever in one direction, and spring means for moving said latch operating lever in the other direction.

3. A can tester, including a wheel for carrying cans from an intake station to a discharge station, means for effecting separation between good and bad cans on said wheel at the discharge station, means for introducing compressed air into said cans, pressure responsive means communicable with said cans and adapted for movement in dependence upon the air pressure therewithin, means comprising an electric switch for controlling said can separating means, a lever adapted to operate said switch, a cam rotatable in response to rotation of said wheel for moving said switch operating lever in one direction, a spring for moving said lever in the opposite direction to effect operation of said switch, a stud, a latch pivoted on said stud and having a long arm engageable with said lever for preventing its movement to switch operating position, rollable bearing elements between said latch and stud, a latch operating lever whose free end engages a short arm of said latch, a second stud pivotally mounting said latch operating lever, rollable bearing elements between said latch operating lever and second stud, said pressure responsive means engaging said latch operating lever between its free end and fulcrum and adjacent said fulcrum to move said latch operating lever in one direction, and spring means for moving said latch operating lever in the other direction.

ED LAXO.

REFERENCES CITED

The following references are of record in the file of this patent:

UNITED STATES PATENTS

| Number | Name | Date |
|---|---|---|
| 762,604 | Adriance et al. | June 14, 1904 |
| 1,850,208 | Jones | Mar. 22, 1932 |
| 1,873,602 | Kruse | Aug. 23, 1932 |
| 1,933,322 | Fagan | Oct. 31, 1933 |
| 1,971,065 | Dieter | Aug. 21, 1934 |